United States Patent
Vo et al.

(10) Patent No.: US 12,307,340 B2
(45) Date of Patent: May 20, 2025

(54) CONSTRUCTING MACHINE LEARNING MODELS

(71) Applicant: AT&T Intellectual Property I, L.P., Atlanta, GA (US)

(72) Inventors: Chris Vo, Sachse, TX (US); Jeremy T. Fix, Acworth, GA (US); Robert Woods, Jr., Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/732,401

(22) Filed: Jun. 3, 2024

(65) Prior Publication Data

US 2024/0320563 A1    Sep. 26, 2024

Related U.S. Application Data

(63) Continuation of application No. 18/155,045, filed on Jan. 16, 2023, now Pat. No. 12,001,930, which is a continuation of application No. 16/861,170, filed on Apr. 28, 2020, now Pat. No. 11,556,854.

(51) Int. Cl.
   *G06N 20/00*    (2019.01)

(52) U.S. Cl.
   CPC .................. *G06N 20/00* (2019.01)

(58) Field of Classification Search
   CPC ............................. G06F 21/602; G06N 20/00
   See application file for complete search history.

(56) References Cited

U.S. PATENT DOCUMENTS

| | | |
|---|---|---|
| 10,878,335 B1 | 12/2020 | Waugh |
| 2017/0372226 A1 | 12/2017 | Costa et al. |
| 2018/0018579 A1 | 1/2018 | Xu et al. |
| 2018/0232663 A1 | 8/2018 | Ross et al. |
| 2021/0142206 A1* | 5/2021 | Ghanea-Hercock ........ G06F 21/602 |

* cited by examiner

*Primary Examiner* — Olugbenga O Idowu (57) ABSTRACT

An example method includes initializing a configuration file for a machine learning model, wherein the initializing is performed in response to receiving a request from a user, and wherein the configuration file comprises a plurality of sections that is configurable by the user, configuring at least one parameter of a feature engineering rules section of the configuration file, wherein the configuring the at least one parameter of the feature engineering rules section is based on a first value provided by the user, configuring at least one parameter of an algorithm definitions section of the configuration file, wherein the configuring the at least one parameter of the algorithm definitions section is based on a second value provided by the user, and populating the configuration file using the feature engineering rules section as configured and the algorithm definitions section as configured, to generate the machine learning model.

20 Claims, 5 Drawing Sheets

CONSTRUCTING MACHINE LEARNING MODELS

This application is a continuation of U.S. patent application Ser. No. 18/155,045, filed on Jan. 16, 2023, now U.S. Pat. No. 12,001,930 which is a continuation of U.S. patent application Ser. No. 16/861,170, filed on Apr. 28, 2020, now U.S. Pat. No. 11,556,854, both of which are herein incorporated by reference in their entirety.

The present disclosure relates generally to artificial intelligence, and relates more particularly to devices, non-transitory computer-readable media, and methods for constructing machine learning models.

BACKGROUND

Machine learning is a subcategory of artificial intelligence that uses statistical models, executed on computers, to perform specific tasks. Rather than provide the computers with explicit instructions, the statistical models are used by the computers to learn patterns and predict the correct tasks to perform. The statistical models may be trained using a set of sample or training data (which may be labeled or unlabeled), which helps the computers to learn the patterns. At run time, new data is processed based on the learned patterns to predict the correct tasks from the new data. Machine learning therefore may be used to automate tasks in a wide variety of applications, including virtual personal assistants, email filtering, computer vision, customer support, fraud detection, and other applications.

SUMMARY

The present disclosure broadly discloses methods, computer-readable media, and systems for constructing machine learning models. In one example, a method performed by a processing system including at least one processor includes initializing a configuration file for a machine learning model, wherein the initializing is performed in response to receiving a request from a user, and wherein the configuration file comprises a plurality of sections that is configurable by the user, configuring at least one parameter of a feature engineering rules section of the configuration file, wherein the configuring the at least one parameter of the feature engineering rules section is based on a first value provided by the user, and wherein the feature engineering rules section is one of the plurality of sections, configuring at least one parameter of an algorithm definitions section of the configuration file, wherein the configuring the at least one parameter of the algorithm definitions section is based on a second value provided by the user, and wherein the algorithm definitions section is one of the plurality of sections, and populating the configuration file using the feature engineering rules section as configured and the algorithm definitions section as configured, to generate the machine learning model.

In another example, a non-transitory computer-readable medium may store instructions which, when executed by a processing system in a communications network, cause the processing system to perform operations. The operations may include initializing a configuration file for a machine learning model, wherein the initializing is performed in response to receiving a request from a user, and wherein the configuration file comprises a plurality of sections that is configurable by the user, configuring at least one parameter of a feature engineering rules section of the configuration file, wherein the configuring the at least one parameter of the feature engineering rules section is based on a first value provided by the user, and wherein the feature engineering rules section is one of the plurality of sections, configuring at least one parameter of an algorithm definitions section of the configuration file, wherein the configuring the at least one parameter of the algorithm definitions section is based on a second value provided by the user, and wherein the algorithm definitions section is one of the plurality of sections, and populating the configuration file using the feature engineering rules section as configured and the algorithm definitions section as configured, to generate the machine learning model.

In another example, a device may include a processing system including at least one processor and a non-transitory computer-readable medium storing instructions which, when executed by the processing system when deployed in a communications network, cause the processing system to perform operations. The operations may include initializing a configuration file for a machine learning model, wherein the initializing is performed in response to receiving a request from a user, and wherein the configuration file comprises a plurality of sections that is configurable by the user, configuring at least one parameter of a feature engineering rules section of the configuration file, wherein the configuring the at least one parameter of the feature engineering rules section is based on a first value provided by the user, and wherein the feature engineering rules section is one of the plurality of sections, configuring at least one parameter of an algorithm definitions section of the configuration file, wherein the configuring the at least one parameter of the algorithm definitions section is based on a second value provided by the user, and wherein the algorithm definitions section is one of the plurality of sections, and populating the configuration file using the feature engineering rules section as configured and the algorithm definitions section as configured, to generate the machine learning model.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for constructing machine learning models. As discussed above, machine learning uses statistical models, executed on computers, to perform specific tasks. Rather than provide the computers with explicit instructions, the statistical models are used by the computers to learn patterns and to predict the correct tasks to perform. The statistical models may be trained using a set of sample or training data (which may be labeled or unlabeled), which helps the computers to learn the patterns. At run time, new data (test data) is processed based on the learned patterns to predict the correct tasks from the new data. Machine learning therefore may be used to automate tasks in a wide variety of applications, including virtual personal assistants, email filtering, computer vision, customer support, fraud detection, and other applications.

The construction of machine learning models is a complicated process that is typically performed by data scientists who have advanced software and programming knowledge. However, these data scientists may lack the specific domain expertise needed to ensure that the machine learning models perform effectively for their intended purposes. For instance, a machine learning model that is constructed to function as a virtual personal assistant should behave differently than a machine learning model that is constructed to function as a customer support tool. An effective machine learning model must be able to learn how the specific types of data the model receives as input (e.g., an incoming text message from a specific phone number, versus keywords in a query posed to a customer support chat bot) map to specific tasks or actions (e.g., silencing a text message alert, versus identifying a department to which to direct a customer query).

Moreover, even within the same domain, separate machine learning models are often constructed for each machine learning problem. In some cases, multiple versions of machine learning models may even be created for the same machine learning problem, where each version may include different experimental feature engineering code logic. The various combinations of copies of model code may therefore become very expensive to store and maintain.

Examples of the present disclosure expose the internal logic of machine learning modeling in order to make the construction of machine learning models a more configuration-driven, and therefore more user-friendly, task. In other words, the exposure of the internal logic makes it possible for an individual who may possess expertise in a particular domain, but who may lack knowledge of data science and programming, to construct an effective machine learning model for a domain problem. In one particular example, the portions of the internal logic that are exposed comprise the feature engineering portions of the machine learning model, e.g., the logic blocks that define the features that will be extracted from raw input data and processed by a machine learning algorithm in order to generate a prediction.

In one example, the present disclosure defines a set of rules (e.g., standards) as atomic building blocks for constructing a machine learning model. From these building blocks, a user may "programmatically" construct a machine learning model by manipulating the configuration file of the model with a human language-like syntax (e.g., a syntax that is closer to human language-such as English-than to computer syntax) in order to tailor the machine learning model to a specific problem or use case. These and other aspects of the present disclosure are discussed in greater detail below in connection with the examples of FIGS. 1-5.

Figure 1:
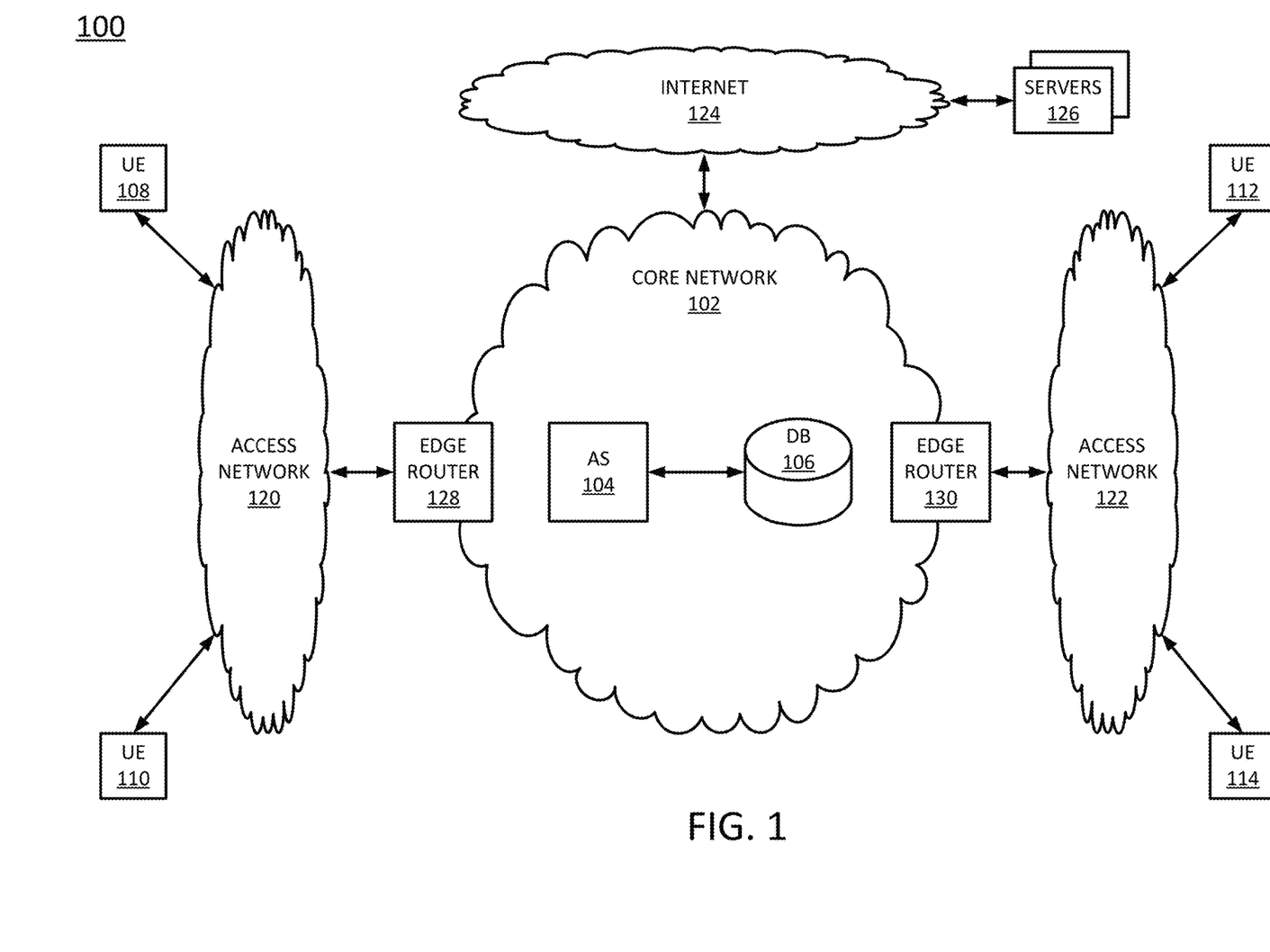
FIG. 1 illustrates an example system in which examples of the present disclosure for constructing machine learning models may operate.

To further aid in understanding the present disclosure, FIG. 1 illustrates an example system 100 in which examples of the present disclosure for constructing machine learning models may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VOIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like.

In one example, one or more servers 126 may be accessible to user endpoint devices 108, 110, 112, and 114 via Internet 124 in general. The server(s) 126 may operate in a manner similar to the AS 104, which is described in further detail below.

In accordance with the present disclosure, the AS 104 may be configured to provide one or more operations or functions in connection with examples of the present disclosure for constructing machine learning models, as described herein. For instance, the AS 104 may be configured to operate as a Web portal or interface via which a user endpoint device, such as any of the UEs 108, 110, 112, and/or 114, may access various predefined logic blocks and machine learning algorithms. The AS 104 may further allow the user endpoint device to manipulate the predefined logic blocks and machine learning algorithms in order to construct a machine learning model that is tailored for a specific use case. For instance, as discussed in further detail below, manipulation of the predefined logic blocks may involve setting parameters of the logic blocks and/or arranging the logic blocks in a pipeline-style execution sequence in order to accomplish desired feature engineering for the machine learning model. Manipulation of the machine learning algorithms may involve selecting one or more specific machine learning models to process features extracted from raw test data (e.g., in accordance with the desired feature engineering) and/or specifying a manner in which to combine the outputs of multiple machine learning models to generate a single prediction.

Figure 5:
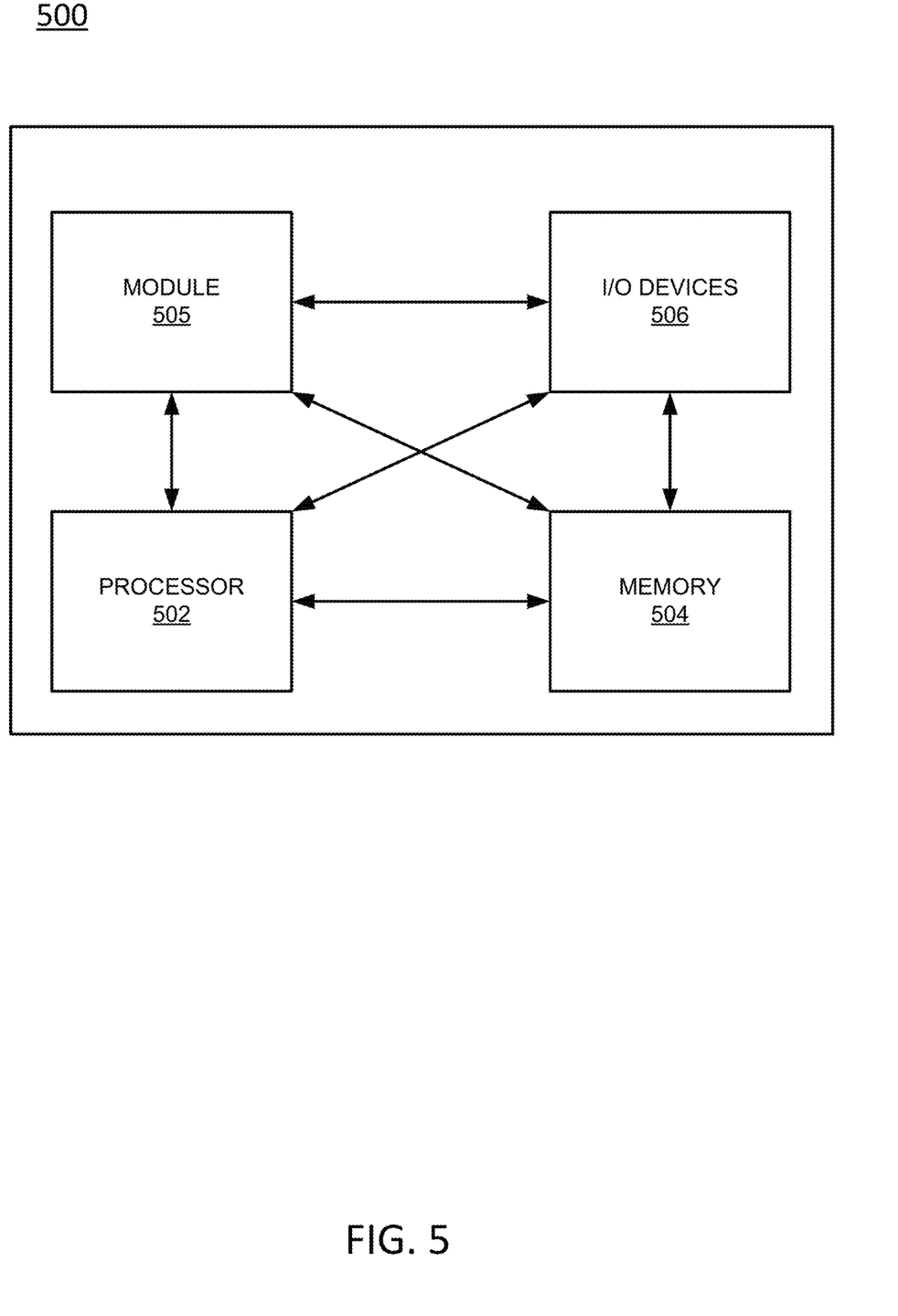
FIG. 5 illustrates an example of a computing device, or computing system, specifically programmed to perform the steps, functions, blocks, and/or operations described herein.

In accordance with the present disclosure, the AS 104 may comprise one or more physical devices, e.g., one or more computing systems or servers, such as computing system 500 depicted in FIG. 5, and may be configured as described above. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

The AS 104 may have access to at least one database (DB) 106, where the DB 106 may store the predefined logic blocks that may be manipulated in order to perform feature engineering for a machine learning model. In one example, at least some of these predefined logic blocks are atomic and generic, which allows the predefined logic blocks to be reused for various different use cases (e.g., for various machine learning models that are programmed to carrying out various different tasks). In one example, at least some of the predefined logic blocks may be crowdsourced, e.g., contributed by individual users of the system 100 who may have software engineering and/or programming expertise. Various specific examples of these predefined logic blocks are discussed in further detail with respect to FIG. 3.

The DB 106 may also store a plurality of different machine learning algorithms that may be selected for inclusion in a machine learning model. Some of these machine learning algorithms are discussed in further detail below; however, the DB may also store additional machine learning algorithms that are not explicitly specified. In addition, the DB 106 may store constructed machine learning models. This may help the AS 104, for instance, to identify the most frequently reused predefined logic blocks, to recommend predefined logic blocks for particular uses (based on previous uses of the predefined logic blocks), and to allow for sharing of the constructed machine learning models among users.

In one example, DB 106 may comprise a physical storage device integrated with the AS 104 (e.g., a database server or a file server), or attached or coupled to the AS 104, to store predefined logic blocks, machine learning algorithms, and/or machine learning models, in accordance with the present disclosure. In one example, the AS 104 may load instructions into a memory, or one or more distributed memory units, and execute the instructions for constructing machine learning models, as described herein. An example method for constructing machine learning models is described in greater detail below in connection with FIG. 3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
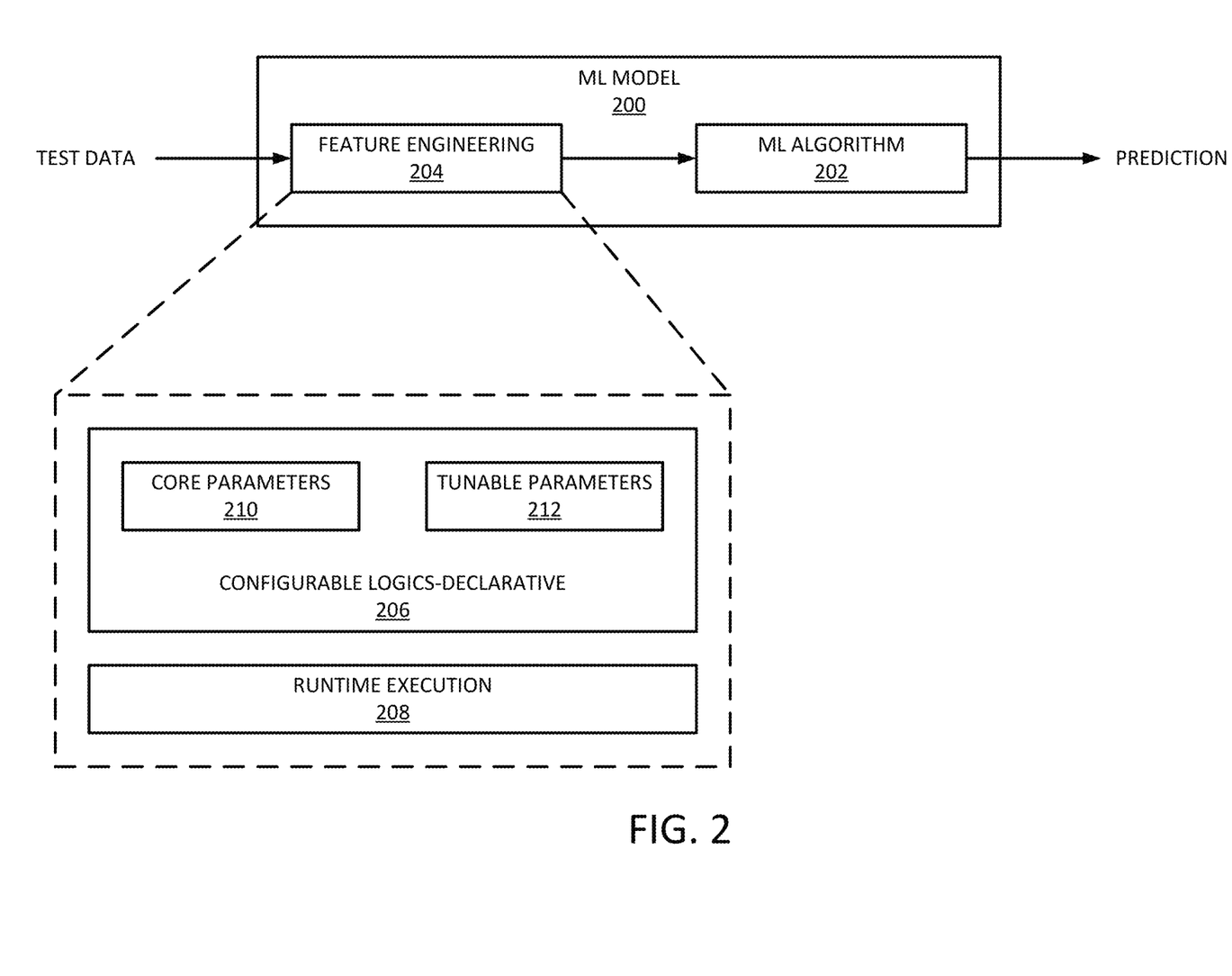
FIG. 2 illustrates a high level block diagram illustrating a machine learning model that may be constructed using the application server of FIG. 1.

FIG. 2 is a high level block diagram illustrating a machine learning model 200 that may be constructed using the AS 104 of FIG. 1. In one example, the machine learning model 200 generally comprises a machine learning algorithm 202 and a feature engineering component 204, as discussed above.

In one example, the machine learning algorithm 202 is an algorithm that takes test data as input, and, based on processing of the test data, generates a prediction as an output. The prediction may comprise an appropriate action to be taken in response to the test data. As the machine learning algorithm 202 is exposed to more data over time, the machine learning algorithm 202 may adjust the manner in which incoming test data is processed (e.g., by adjusting one or more parameters of the machine learning algorithm 202) in order to improve the quality of the predictions. For instance, the machine learning algorithm 202 may receive feedback regarding the quality of the predictions, and may adjust one or more parameters in response to the feedback in order to ensure that high-quality predictions are generated more consistently. In one example, the machine learning algorithm 202 may initially be trained on a set of training data (which may be labeled or unlabeled). However, even after training, the machine learning algorithm 202 may continue to adjust the parameters as more test data is processed. In one example, the machine learning algorithm 202 may be any machine learning model, such as a gradient boost machine (GBM) algorithm, an extreme gradient boosting (XGBoost) algorithm, a LightGBM algorithm, or a random forest algorithm, for instance.

In one example, the features engineering component 204 utilizes at least one data mining technique in order to extract useful features from the test data. The features engineering component 204 may rely on domain knowledge (e.g., knowledge of the domain for which the machine learning model 200 is being constructed) in order to define the features that should be extracted from the test data. In one example, the feature engineering component 204 comprises a set of configurable logics 206 and a runtime execution component 208.

The set of configurable logics 206 may generally comprise components of the machine learning model 200 that can be configured by a user. For instance, examples of the present disclosure may present a system and user interface that allow a user to configure and customize certain parameters of the machine learning model 200 for a particular use. As discussed in further detail below, some of these parameters may be encoded in programming blocks. The programming blocks may be reusable in the sense that the programming block generally define certain aspects of the corresponding parameters, while allowing the user to customize these aspects through the definition of specific values. In one example, the set of configurable logics 206 may include a set of core parameters 210 and a set of tunable parameters 212.

In one example, the set of core parameters 210 may include programmable operation logic blocks for basic operations (e.g., load data, save data, fetch remote data, etc.), where the operation logic blocks can be combined, and the values for the operation logic blocks can be defined, to construct more complex operations. For instance, a sequence of the basic operations, when executed in order, may result in a more complex operation being performed.

In one example, the set of tunable parameters 212 may include blocks of predefined code logic that may be used to extract common feature types. For instance, a common feature type may comprise a number of days elapsed between two events, a total number of words in a string of text, or some other feature types. The specifics of the feature type may vary based on application. For instance, for a machine learning model that is designed to detect fraudulent claims for mobile phone replacements, the number of days elapsed between the activation date of a mobile phone and a date a claim for replacement of the mobile phone was submitted may be a feature that one would want to extract. However, for a machine learning model that is designed to remind a user to take a prescribed medication (e.g., a virtual personal assistant), the number of days elapsed between the last time the user took the prescribed medication and the current day may be a feature that one would want to extract. Thus, a predefined code logic block to extract the number of days elapsed between events may be customized by specifying the events for which the dates are to be extracted. The events may be specified by indicating a column of a data set in which the dates of the events are recorded.

Figure 3:
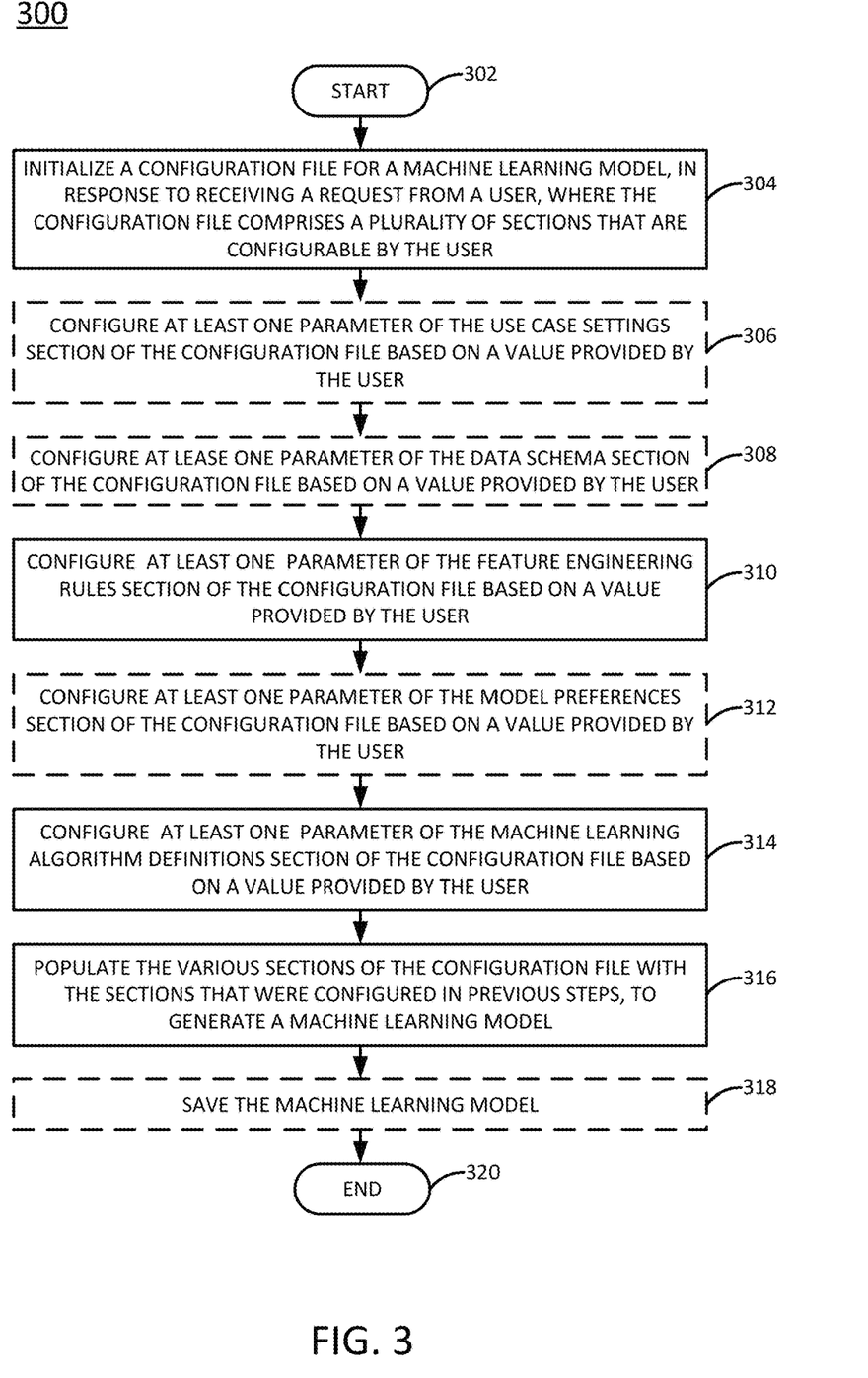
FIG. 3 illustrates a flowchart of an example method for constructing machine learning models, in accordance with the present disclosure.

FIG. 3 illustrates a flowchart of an example method 300 for constructing machine learning models, in accordance with the present disclosure. In one example, steps, functions and/or operations of the method 300 may be performed by a device as illustrated in FIG. 1, e.g., AS 104 or any one or more components thereof. In one example, the steps, functions, or operations of method 300 may be performed by a computing device or system 500, and/or a processing system 502 as described in connection with FIG. 5 below. For instance, the computing device 500 may represent at least a portion of the AS 104 in accordance with the present disclosure. For illustrative purposes, the method 300 is described in greater detail below in connection with an example performed by a processing system, such as processing system 502.

The method 300 begins in step 302 and proceeds to step 304. At step 304, the processing system may initialize (e.g., dynamically generate) a configuration file for a machine learning model, in response to receiving a request from a user, where the configuration file comprises a plurality of sections (e.g., logic blocks) that are configurable by the user. The request may include a use case definition for the machine learning model, where the user case definition is provided by the user to define a purpose for the machine learning model (e.g., filtering spam emails, detecting fraudulent commercial transactions, etc.). For instance, the user may wish to analyze a dataset relating to claims for replacements for mobile phones in order to detect whether any of the claims are fraudulent.

In one example, the configuration file may contain configuration definitions that allow the machine learning model to solve any machine learning model without having to change the machine learning model's code. The configuration file may be specified in the JavaScript Object Notation (JSON) data-interchange format and may include a plurality of sections. In one example, the plurality of sections may include at least the following sections: use case settings, dataset schema, feature engineering (FE) rules, model preferences, and algorithms. For instance, one example configuration file may be represented as:

```
{
    "usecase" : {"name": "Identify Modeler"...},
    "schema" : {"col_sep": ","},
    "fe_rules" : [...],
    "preference" : {"ROW_DISPLAY": "5"...},
    "algorithms" : [...]
}
``` where "fe" in the configuration file stands for "feature engineering." It should be noted, however, configuration rules for feature engineering can be both defined manually by a user (e.g., early on) and also automated (e.g., later, by a recommendation system).

In one example, a distributed version-control system may be used to retain a revision history for any changes to the configuration file (e.g., for recovery, benchmarking the effectiveness of any changes, and the like). The various sections of the configuration file may be further defined by the user as described in further detail below.

For instance, in optional step 306 (illustrated in phantom), the processing system may configure at least one parameter of the use case settings section of the configuration file based on a value provided by the user. In one example, the use case settings section specifies settings and parameters that are defined at the use case level (e.g., globally within a model execution). For instance, the use case settings section may allow one or more predefined machine learning algorithms to be selected (e.g., by the user) for model execution (select_alg).

The use case settings section may also allow the user to specify multiple ensembling options (ensemble) for the cases where multiple machine learning algorithms are selected. The ensembling options may dictate how the outputs of the multiple machine learning algorithms may be combined to generate a single prediction, and may include options such as average (AVG) and top (TOP). Average may average the outputs from the multiple machine learning algorithms, whereas top may select the output having the top (e.g., highest) score. In one example, scoring may be done automatically by internally splitting the training data for the machine learning model into an 80/20 "clean" split (i.e., wherein categorical data is appropriately split for regression model type). For classification, the split may be sampled randomly.

In further examples, the use case settings section may allow the user to specify the locations (or paths) where the training data, testing data, prediction data (e.g., machine learning algorithm output), and other data may be stored.

One example use case settings section of the configuration file may be represented as:

```
"usecase" : {
    "name"              : "Identify Modeler",
    "model_type"        : "propensity",
    "select_alg"        : ["GBM", "XGBoost"],
    "ensemble"          : ["AVG", "TOP"],
    "metric"            : "LOGLOSS",
    "training_path"     : "/folder/Training.csv",
    "testing_path"      : "/folder/Holdout.csv",
    "prediction_path"   : "/folder/Prediction.csv"
    "intermediate_path" : "/folder/inrtermediate/"
},
```

In optional step 308 (illustrated in phantom), the processing system may configure at least one parameter of the data schema section (also referred to as dataset schema section) of the configuration file based on a value provided by the user. In one example, the dataset schema section allows the user to specify parameters that are specific to the dataset for the indicated use case. For instance, the dataset schema section may specify the minimum information that is needed about the dataset in order for the machine learning model to know what to look for (e.g., key columns in the dataset) and what to predict for (e.g., a target column of the dataset). In some examples, rather than being specified by the user, the dataset schema section parameters may be automatically inferred and presented to the user for review and confirmation.

One example dataset schema section of the configuration file may be represented as:

```
"schema" : {
    "col_sep"      : ",",
    "row_id"       : "index",
    "target_label" : "modeler",
    "date field"   : "",
    "group_fields" : [ ]
},
```

In step 310, the processing system may configure at least one parameter of the FE rules section of the configuration file based on a value provided by the user (e.g., a first value). In one example, the FE rules section may allow the user to specify feature engineering definitions to invoke and control FE logic embedded in the machine learning model. In one example, the FE logic is executed in sequential order, e.g., from the top of a rules list (fe_rules) to the bottom of the rules list, like a pipeline. In one example, the FE rules section may include two types of rule blocks: predefined features and operators for the user to build his or her own features.

In one example, a set of common parameters is applicable to the entire FE rules section pipeline (rules list). If any child block of the FE rules section does not explicitly define the set of common parameters, then appropriate default values may be assigned to the parameters. What constitutes an "appropriate" default value may vary depending on the use case. The set of common parameters may include, for instance, an applicable phase (apply_phase), what to do on error (on_error), and/or other parameters.

The applicable phase parameter may allow the FE logic to be invoked in any or multiple phases of the machine learning model. A default empty array may be represented as [ ]. In one example, the possible phases may include at least: train, post-train, predict, and post-predict. The train phase may occur immediately after raw training data is loaded to the machine learning model, but before any default feature engineering is invoked. The post-train phase may occur in the training phase, immediately after the machine learning model is trained (fitted). The predict phase may occur immediately after the raw test data is loaded, but before any default feature engineering is invoked. The post-predict phase may occur in the predict phase, immediately after a prediction is generated.

The what to do on error parameter may allow any of a plurality of possible options when an error is encountered during execution of the FE logic pipeline: stop, abort, and break. In one example, the default setting for the what to do on error parameter is null, which is equivalent to suppressing the error and continuing execution of the next FE rule in the pipeline (the error will still be logged for troubleshooting and auditing, however).

The stop option may cease execution of the current machine learning model. However, since a machine learning model may invoke other machine learning models, a stop will only cease execution of the current machine learning model, but not the other machine learning models that may be invoked by the current machine learning model. Thus, for instance, if five machine learning models are being ensembled and one is stopped, the remaining four machine learning models may still be ensembled.

The abort option is similar to the stop option; however, the abort option may go a step further by detecting all forked child processes from the parent machine learning model and halting any process identifiers (or the equivalent) in order to make sure that all resources and related logic executions are completely and gracefully ceased.

The break option may skip all remaining FE rules and "break out" the pipeline, so that the execution flow of the machine learning models continues.

In one example, each unique FE rule block definition is atomic and designed for maximum reusability (e.g., by varying the input parameters). For instance, as discussed above, an FE rule block may execute a basic operation such as computing the number of days elapsed between two specified events or dates. However, the values of the FE rule block may be configured with values selected by the user, where the values tell the FE rule block where to find the dates in a given input dataset (e.g., which columns of the dataset to compare).

One example FE rules section of the configuration file may be represented as:

```
"fe_rules" : [
    {"fe_name": "word_count". . .},
    {"fe_name": "word_match". . .},
    {"fe_name": "word_match". . .},
    {"fe_name": "ignore_column". . .},
    {"fe_name": "encode_multivalued". . .},
    {"fe_name": "peer_pressure". . .},
    {"fe_name": "save_panda". . .},
    {"fe_name": "save_pickle". . .},
    {"fe_name": "load_panda". . .},
    {"fe_name": "load_pickle". . .},
    {"fe_name": "download_api". . .},
    {"fe_name": "download_web". . .},
    {"fe_name": "download_ftp". . .},
    {"fe_name": "download_scp". . .},
    {"fe_name": "join_with_panda". . .},
    {"fe_name": "join_with_pickle". . .},
    {"fe_name": "exec_script". . .},
    {"fe_name": "exec_script". . .},
    {"fe_name": "exec_script". . .},
    {"fe_name": "file_cleanup". . .},
],
```

As discussed above, the FE rules section may include two types of rule blocks: predefined features and operators for the user to build his or her own features. The predefined features may comprise code logic that is embedded in the machine learning model to handle commonly used features engineering. However, various parameters may be provided to allow for further customization. For instance, the user may specify the original column and the new column (base) names. The feature blocks may be tied to the code logic by "fe_name" (e.g., above). Each predefined feature can be specified multiple times to target different columns.

Figure 4:
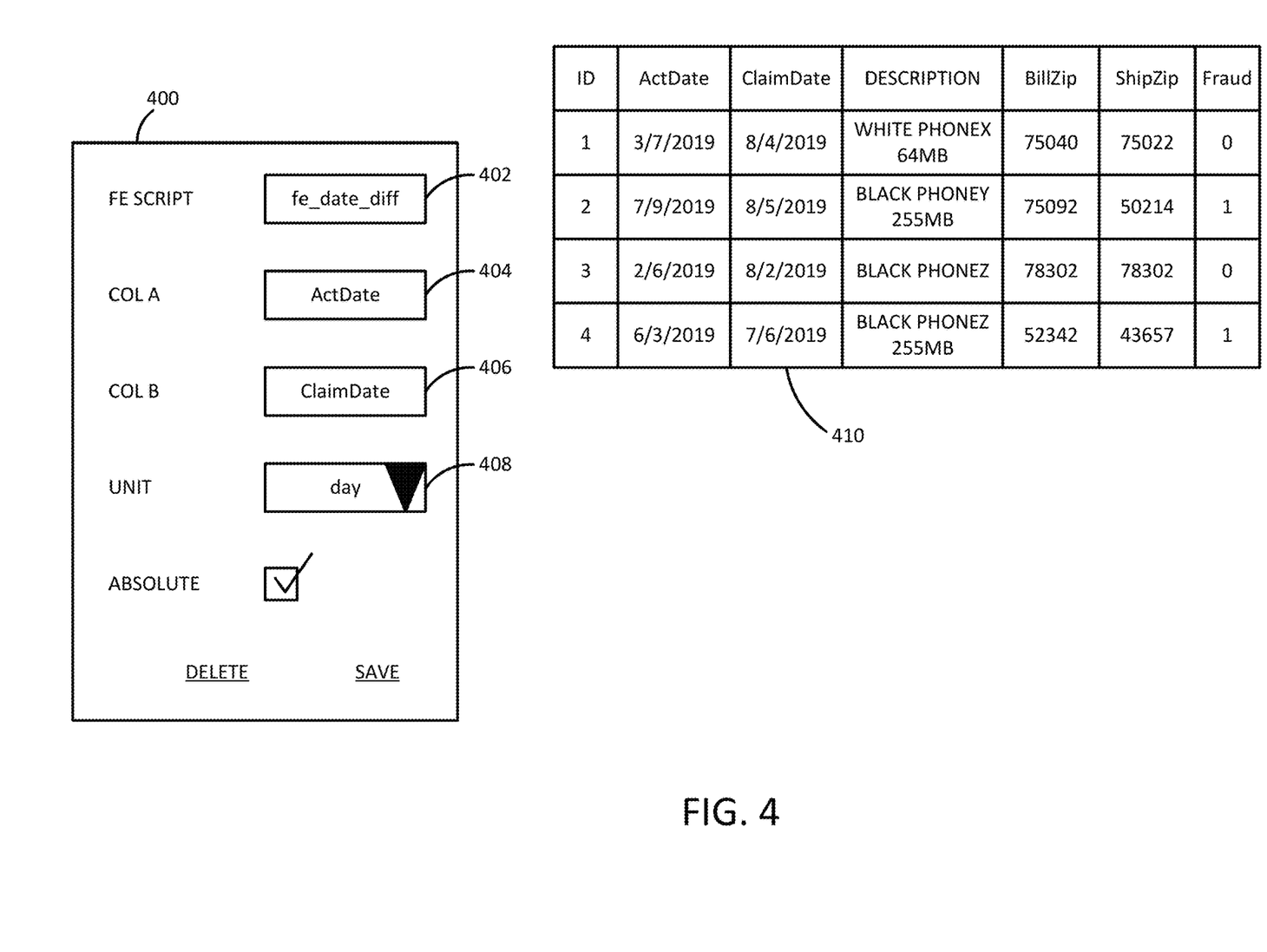
FIG. 4 illustrates an example graphical user interface via which a user may provide values to configure the parameters of an example generic feature engineering script.

FIG. 4, for instance, illustrates an example graphical user interface (GUI) 400 via which a user may provide values to configure the parameters of an example generic feature engineering script (logic block). In this case, the example feature engineering script calculates the number of days elapsed between two specified events or dates.

The example GUI 400 may include a first field 402 that specifies the feature engineering script to be configured (e.g., fe_date_diff). The example GUI 400 may further include second and third fields 404 and 406, respectively, to specify the locations in an input dataset 410 from which to retrieve data to be processed by the feature engineering script. In the example illustrated, the fe_date_diff script may compute a difference by subtracting a value in a first column of the input dataset 410 (identified as Col A in the example GUI 400) from a value in a second column of the input dataset 410 (identified as Col B in the example GUI 400). A fourth field 408 of the example GUI 400 may provide a drop down menu that allows the user to select the units of measure for the computed difference (e.g., days, weeks, months, etc.).

For instance, to calculate the number of days elapsed between the activation of a mobile phone and the filing of a claim to replace the mobile phone, the second field 404 (Col A) may be configured to select the value in the ActDate (activation date) column of the input dataset 410; the third field 406 (Col B) may be configured to select the value in the Claim Date (claim date) column of the input dataset 410; and the fourth field 408 may be configured to set the unit of measure to days.

It should be noted that similar feature engineering scripts may be programmed to perform different operations on different portions of the input dataset 410. For instance a feature engineering script that is programmed to compute a simple numerical difference could be used to compute the spread between two zip codes (e.g., the BillZip or billing zip code and ShipZip or shipping zip code columns of the input dataset).

Referring back to FIG. 3, in one example, the predefined features include at least the following features: word count (i.e., count the occurrence of a word string in a given text), word match (i.e., flag whether a word string in a list of word strings is found in a given text), ignore column (i.e., exclude a list of columns from the dataset), or encode multivalued (i.e., perform encoding on a multi-valued column, where the result may comprise a binary hash, an average, a sum, or a math operation).

One example word count feature may be represented as:

```
{
    "fe_name"        : "word_count",
    "apply_phase"    : ["train", "predict"],
    "parameters"     :{
        "txt_col"        : "title",
        "new_col"        : "fe_title_data_scientist_occur",
        "keywords"       : ["data", "scientist"],
        "del_original"   : false
    }
}
```

One example word match feature may be represented as:

```
{
    "fe_name"        : "word_match",
    "apply_phase"    : ["train", "predict"],
    "parameters"     : {
        "txt_col"        : "title",
        "new_col"        : "fe_title_word_match",
        "keywords"       : ["data scientist", "data", "scientist", "analyst", "director", "designer", "engineer"],
        "del_original"   : true
    }
}
```

One example ignore column feature may be represented as:

```
{
    "fe_name"        : "ignore_column",
    "apply_phase"    : ["train", "predict"],
    "parameters"     : {
        "col_list"       : ["Column 1", "Column 2"]
    }
}
```

One example encode multivalued feature may be represented as:

```
{
    "fe_name"       : "encode_multivalued",
    "apply_phase"   : ["train", "predict"],
    "parameters"    : {
        "txt_col"       : "sale_list",
        "sep"           : ", ",
        "new_col"       : "fe_sale_list",
        "operation"     : ["COUNT", "SUM", "MAX", "MIN",
                           "ENCODE"],
        "del_original"  : false
    }
}
```

In one example, the machine learning model is loaded with programmable operation logic blocks, as discussed above, that allow users to engineer complex features. The operation blocks can be specified in any combination to provide an execution flow that is similar to a pipeline. That is, the execution flow may be performed sequentially, from the top to the bottom of the fe_rules list. Each operation block may be atomic and generic to maximize customization and reusability while preventing duplicate block definitions.

In one example the operators for users to build their own features include at least the following features: save data, load data, fetch remote data, join external data, execute script, and storage cleanup.

In one example, the save data operation saves a data frame to either a text file with a configurable separator or in pickle file format (i.e., a binary file for fast saving and loading). The pickle format may allow data to pass more quickly between operation blocks. One example save data operation may be represented as:

```
{
    "fe_name"       : "save_pickle",
    "apply_phase"   : ["train", "predict"],
    "parameters"    : {
        "col_list"          : [ ],
        "output_data_file"  : "extended_feature_yyy.pickle"
    }
}
```

In one example, the load data operation loads data to a data frame from a text file or from a pickle format file. Thus, the load data operation is the reverse of the save data operation. One example load data operation may be represented as:

```
{
    "fe_name"       : "load_panda",
    "apply_phase"   : ["train", "predict"],
    "parameters"    : {
        "col_sep"           : ", ",
        "output_data_file"  : "extended_feature_yyy.csv"
    }
}
{
    "fe_name"       : "load_pickle",
    "apply_phase"   : ["train", "predict"],
    "parameters"    : {
        "output_data_file"  : "extended_feature_yyy.pickle"
    }
}
```

In one example, the fetch remote data operation may include multiple connector operation blocks to allow a user to download a file from a Web page, an application programming interface (API), a file transfer protocol (FTP) operation, or a secure copy protocol (SCP) operation. The remote data file may be in any format, but often will be either a script (e.g., Python, R, Shell, or another script) or a data file in American Standard Code for Information Interchange (ASCII) or binary pickle format.

In one example, a user can define database blocks such as query blocks for structured query language (SQL) server, Oracle, Hive, or the like. However, these query blocks can be easily addressed by interfacing the database with an API. One example fetch remote data operation may be represented as:

```
{
    "fe_name"       : "download_api",
    "apply_phase"   : ["train"],
    "parameters"    : {
        "api_key"       : "123456789:xxxxxxxxx:zzzzzzzzz",
        "user_name"     : "xxxxxxxxx",
        "password"      : "zzzzzzzzz",
        "api_param"     : {
            "param_name"    : "input_json_param",
            "param_value"   : { }
        }
    }
}
{
    "fe_name"       : "download_web",
    "apply_phase"   : ["predict"],
    "parameters"    : {
        "url"           : "http://domain/data.csv",
        "content_type"  : "text/csv",
        "local_file"    : "extended_feature_xxx.csv",
    }
}
{
    "fe_name"       : "download_ftp",
    "apply_phase"   : ["train", "predict"],
    "parameters"    : {
        "host"          : "123.123.123.123",
        "user_name"     : "xxxxxxxxx",
        "password"      : "zzzzzzzzz",
        "remote_path"   : "/public/data.csv",
        "local_file"    : "extended_feature_xxx.csv",
    }
}
{
    "fe_name"       : "download_scp",
    "apply_phase"   : ["train", "predict"],
    "parameters"    : {
        "host"          : "123.123.123.123",
        "user_name"     : "xxxxxxxxx",
        "passwordssh_key_file" : "private_rsa.key",
        "remote_path"   : "/users/xxxxxxxxx/data.csv",
        "local_file"    : "extended_feature_xxx.csv"
    }
}
```

In one example, the join external data operation may join or merge a current data frame with an external dataset to be loaded from a file. In one example the join external data operation is enabled by specifying the key column(s) and may be a left-join, a right-join, or an inner-join operation. Thus, the join external dataset operation may be equivalent to the joining of two tables by a primary key in a relational database. The merge operation in this case, unlike the join operation, is simply an extension (by columns) of two data frames with the same indexing. One example save data operation may be represented as:

```
{
    "fe_name"      : "join_with_panda",
    "apply_phase"  : ["post_predict"],
    "parameters"   : {
        "local_file"  : "extended_feature_xxx.csv",
        "col_sep"     : ",",
        "left_key"    : ["row_id"],
        "right_key"   : ["row_id"],
        "join_type"   : "right"
    }
}
{
    "fe_name"      : "join_with_pickle",
    "apply_phase"  : ["post_predict"],
    "parameters"   : {
        "local_file"  : "extended_feature_xxx.pickle"
        "left_key"    : ["row_id"],
        "right_key"   : ["row_id"],
        "join_type"   : "inner"
    }
}
```

In one example, the execute script operation is the most powerful operation block. The execute script operation may allow the machine learning model to execute external scripts, executables, and shell commands to further extend the model capability. For instance, the execute script operation may be used for data transformation, ad-hoc feature engineering, execution of (child) machine learning models, recursive execution of the current machine learning model, ensembling of (child) machine learning models, or grid searching (child) machine learning models.

In one example, the execute script operation block includes a base_command parameter that allows the machine learning model to execute any shell command supported by the hosting environment. This capability may be enabled via a dynamic library installation via the pip, Conda, Cran, or Maven package installers. The machine learning model may use this logic to perform operational remediation (e.g., platform and network healing), alerting, and the like based in the prediction results of the machine learning model.

In a further example, the execute script operation block also includes a config_file parameter that allows the targeted execution entity to dynamically receive parameters from the caller model (which includes the current machine learning model invoking another machine learning model, or even itself, with a different configuration file to obtain different predictions).

One example execute script operation may be represented as:

```
{
    "fe_name"      : "exec_script",
    "apply_phase"  : ["post_predict"],
    "parameters"   : {
        "base_command" : ["python [SCRIPT NAME] -c [CONFIG_FILE]"],
        "script_name"  : ["xxxxx.py"],
        "config_file"  : "/folder/config.json"
    }
}
{
    "fe_name"      : "exec_script",
    "apply_phase"  : ["predict"],
    "parameters"   : {
        "base_command" : ["Rscript [SCRIPT NAME] -c [CONFIG_FILE]"],
        "script_name"  : ["xxxxx.R"],
        "config_file"  : "/folder/config_YYY-MM-DD-hh-mm.json"
    }
}
```

In one example, the storage cleanup operation may be the last operation specified in the FE flow (pipeline), in order to clean up any intermediate data and/or script files. The storage cleanup operation allows for the deletion of files and folders and may work on a file-pattern string and data-format string. One example of a storage cleanup operation may be represented as:

```
{
  "fe_name"     : "file_cleanup",
  "apply_phase" : ["train", "predict", "post_predict"],
  "on_error"    : "break",
  "parameters"  : {
     "file_list" : ["data.csv", "file.*", "folder-YYYY-MM-DD"]
  }
}
```

In optional step 312 (illustrated in phantom), the processing system may configure at least one parameter of the model preferences section of the configuration file based on a value provided by the user. In one example, model preferences comprise various options to customize the execution of the machine learning model, to provide increased flexibility and richer experimentation. The values of the preferences are designed to globally control the behavior of the model execution. The default values are optimal in most cases; however, users can change the configuration for specific needs. One example of a model preferences block may be represented:

```
"preference"   : {
   "ROW_DISPLAY"    : "5",
   "COL_DISPLAY"    : "7",
   "SUB_NA_VAL"     : -9999,
   "PROP_COLUMN"    : "propsensitypositiveclass",
   "DEBUG"          : true,
   "PARAM_TUNING"   : false,
   "SAVE_TRAINING"  : true,
   "SAVE_TESTING"   |: true
}
```

As discussed above, users can change the default values of the preferences to suit specific needs. For instance, a user may wish to change the amount of data to preview during various stages of transformation for debugging purposes (e.g., showing only the top five rows by seven columns), may wish to substitute NULL date with −9999 so that certain algorithms can process the data, may wish to perform parameter tuning every time a machine learning model is trained, or may wish to cache (preprocessed) training and testing data for performance (which may require additional disk storage).

In step 314, the processing system may configure at least one parameter of the machine learning algorithm definitions section of the configuration file based on a value provided by the user (e.g., a second value). In one example, the algorithms definitions section defines the machine learning algorithms that are incorporated into the machine learning model, such as GBM, XGBoost, LightGBM, random forest, and/or other machine learning algorithms. In one example, the model definitions section may include hyperparameter options for parameter tuning, which may be used when the parameter tuning logic of the machine learning model is invoked. The resulting best estimator (which may be found using a grid search) may be updated to the "best_estimator" configuration definition.

In one example, each machine learning algorithm may be invoked with corresponding "best estimator" values, which may be found through the parameter tuning process. The best estimator values are the most optimal parameter values for the corresponding machine learning algorithm and for a specific dataset. In one example, a default parameter tuning process may be disabled in order to improve performance. For instance, the default "best_estimator" is optimal for most use cases. However, when the parameter tuning option is enabled, a new "best_estimator" may be determined during model training, e.g., by searching through all of the search values defined in the hyperparameter options. Once determined, the "best_estimator" values will likely remain constant for that use case, since the nature of the data sets (e.g., data structure, data volume, etc.) will likely remain constant.

On example algorithms definitions section may be represented as:

```
"algorithms" : [
   {
      "alg_name"       : "GBM",
      "hyperparameter" : {
         "n_estimators"      : [100, 250, 500, 750, 1000],
         "learning_rate"     : [0.01, 0.025, 0.05, 0.075, 0.1, 0.15, 0.2],
         "max_depth"         : [4, 6, 8, 9, 12, 15, 20],
         "subsample"         : [0.6, 0.65, 0.7, 0.75, 0.8, 0.85, 0.9, 0.95, 1],
         "min_samples_split" : [5, 10, 20, 40, 60, 100],
         "min_samples_leaf"  : [3, 5, 7, 9],
      }
      "best_estimator"  : {"criterion": "friedman_mse". . .}
   }
   {"alg_name": "LightGBM". . .},
   {"alg_name": "XGBoost". . .},
   {"alg_name": "RandomForest". . .}
]
```

In step 316, the processing system may populate the various sections of the configuration file with the sections that were configured in steps 306-314, to generate a machine learning model. The user-provided parameters that were used to configure the various sections of the configuration file may thus contribute to the customization of the final machine learning model that is generated.

In optional step 318, the processing system may save the machine learning model. In one example, the machine learning model may be saved in a location where the machine learning model may be accessible to other users.

The method 300 may end in step 320.

It should be noted that the method 300 may be expanded to include additional steps or may be modified to include additional operations with respect to the steps outlined above. In addition, although not specifically specified, one or more steps, functions, or operations of the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for constructing machine learning models, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 505 for constructing machine learning models (e.g., a software program comprising computer-executable instructions) can be loaded into memory 504 and executed by hardware processor element 502 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for constructing machine learning models (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   initializing, by a processing system including at least one processor, a configuration file for a machine learning model, wherein the initializing is performed in response to receiving a request from a user, and wherein the configuration file comprises a plurality of sections that is configurable by the user;
   configuring, by the processing system, at least one parameter of a feature engineering rules section of the configuration file, wherein the feature engineering rules section comprises a plurality of logic blocks, wherein each logic block of the plurality of logic blocks defines a feature to be extracted by the machine learning model from an input dataset, wherein the configuring the at least one parameter of the feature engineering rules section is based on a first value inferred for the user, and wherein the feature engineering rules section is one of the plurality of sections;

configuring, by the processing system, at least one parameter of an algorithm definitions section of the configuration file, wherein the configuring the at least one parameter of the algorithm definitions section is based on a second value inferred for the user, and wherein the algorithm definitions section is one of the plurality of sections; and populating, by the processing system, the configuration file using the feature engineering rules section as configured and the algorithm definitions section as configured, to generate the machine learning model.

2. The method of claim 1, wherein the configuration file is specified in a javascript object notation data-interchange format.

3. The method of claim 1, wherein the configuring the at least one parameter of the feature engineering rules section comprises:

retrieving, by the processing system, a generic version of at least one logic block of the plurality of logic blocks from a library of logic blocks; and inserting, by the processing system, the first value into a field of the generic version of the at least one logic block to generate a customized version of the at least one logic block, wherein the customized version of the at least one logic block is used to populate the configuration file.

4. The method of claim 1, wherein at least one logic block of the plurality of logic blocks defines a phase of the machine learning model during which to execute the at least one logic block.

5. The method of claim 1, further comprising:

reusing, by the processing system, at least one logic block of the plurality of logic blocks to configure a feature engineering rules section of another configuration file for another machine learning model, wherein the reusing comprises configuring at least one parameter of the feature engineering rules section of the another configuration file with a third value specified by another user.

6. The method of claim 1, wherein the algorithm definitions section comprises at least one logic block that defines a machine learning algorithm to be used by the machine learning model.

7. The method of claim 6, wherein the at least one parameter of the algorithm definitions section comprises an identity of the machine learning algorithm.

8. The method of claim 6, wherein the machine learning algorithm is one of a plurality of predefined machine learning algorithms.

9. The method of claim 1, further comprising:

configuring, by the processing system, at least one parameter of a use case settings section of the configuration file, wherein the configuring the at least one parameter of the use case settings section is based on a third value inferred for the user, wherein the use case settings section is one of the plurality of sections, and wherein the populating further uses the use case settings section as configured.

10. The method of claim 9, wherein the use case settings section specifies settings and parameters that are defined at a use case level for the machine learning model.

11. The method of claim 10, wherein the use case settings section further specifies a manner in which to ensemble a plurality of outputs of a plurality of machine learning algorithms specified in the algorithm definitions section.

12. The method of claim 1, further comprising:

configuring, by the processing system, at least one parameter of a data schema section of the configuration file, wherein the configuring the at least one parameter of the data schema section is based on a third value inferred for the user, wherein the data schema section is one of the plurality of sections, and wherein the populating further uses the data schema section as configured.

13. The method of claim 12, wherein the data schema section specifies a minimum information that is needed about the input dataset.

14. The method of claim 1, further comprising:

configuring, by the processing system, at least one parameter of a model preferences section of the configuration file, wherein the configuring the at least one parameter of the model preferences section is based on a third value inferred for the user, wherein the model preferences section is one of the plurality of sections, and wherein the populating further uses the model preferences section as configured.

15. The method of claim 14, wherein the model preferences section specifies a plurality of options to customize an execution of the machine learning model.

16. The method of claim 1, wherein executing the plurality of logic blocks comprises executing the plurality of logic blocks as a pipeline from a top of a rules list to a bottom of the rules list.

17. The method of claim 16, wherein a set of common parameters is applicable to an entirety of the pipeline.

18. The method of claim 17, wherein the set of common parameters specifies what to do when an error is encountered during an execution of the pipeline.

19. A non-transitory computer-readable medium storing instructions which, when executed by a processing system in a communications network, cause the processing system to perform operations, the operations comprising:

initializing a configuration file for a machine learning model, wherein the initializing is performed in response to receiving a request from a user, and wherein the configuration file comprises a plurality of sections that is configurable by the user;

configuring at least one parameter of a feature engineering rules section of the configuration file, wherein the feature engineering rules section comprises a plurality of logic blocks, wherein each logic block of the plurality of logic blocks defines a feature to be extracted by the machine learning model from an input dataset, wherein the configuring the at least one parameter of the feature engineering rules section is based on a first value inferred for the user, and wherein the feature engineering rules section is one of the plurality of sections;

configuring at least one parameter of an algorithm definitions section of the configuration file, wherein the configuring the at least one parameter of the algorithm definitions section is based on a second value inferred for the user, and wherein the algorithm definitions section is one of the plurality of sections; and populating the configuration file using the feature engineering rules section as configured and the algorithm definitions section as configured, to generate the machine learning model.

20. A device comprising:
a processing system including at least one processor; and
a non-transitory computer-readable medium storing instructions which, when executed by the processing system, cause the processing system to perform operations, the operations comprising:
- initializing a configuration file for a machine learning model, wherein the initializing is performed in response to receiving a request from a user, and wherein the configuration file comprises a plurality of sections that is configurable by the user;
- configuring at least one parameter of a feature engineering rules section of the configuration file, wherein the feature engineering rules section comprises a plurality of logic blocks, wherein each logic block of the plurality of logic blocks defines a feature to be extracted by the machine learning model from an input dataset, wherein the configuring the at least one parameter of the feature engineering rules section is based on a first value inferred for the user, and wherein the feature engineering rules section is one of the plurality of sections;
- configuring at least one parameter of an algorithm definitions section of the configuration file, wherein the configuring the at least one parameter of the algorithm definitions section is based on a second value inferred for the user, and wherein the algorithm definitions section is one of the plurality of sections; and
- populating the configuration file using the feature engineering rules section as configured and the algorithm definitions section as configured, to generate the machine learning model.

* * * * *